United States Patent [19]

Krone et al.

[11] Patent Number: 4,604,855
[45] Date of Patent: Aug. 12, 1986

[54] WRAPPING APPARATUS FOR ROUND BALES IN BALING PRESSES

[75] Inventors: Bernard Krone, Spelle; Wilhelm Ahler, Stadtlohn, both of Fed. Rep. of Germany

[73] Assignee: Maschinenfabriken Bernard Krone GmbH, Spelle, Fed. Rep. of Germany

[21] Appl. No.: 607,367

[22] Filed: May 7, 1984

[30] Foreign Application Priority Data

Jun. 18, 1983 [DE] Fed. Rep. of Germany ....... 3322024

[51] Int. Cl.[4] ......................... B65B 11/04; B65B 61/06
[52] U.S. Cl. .......................................... 53/64; 53/389; 53/118; 53/587; 83/586
[58] Field of Search ................... 53/211, 587, 389; 83/524, 586, 587, 697, 835; 226/156

[56] References Cited

U.S. PATENT DOCUMENTS

| | | | |
|---|---|---|---|
| 807,239 | 12/1905 | Brition | 83/586 |
| 1,537,980 | 5/1925 | Asselin | 83/697 X |
| 2,815,626 | 12/1957 | Fahrenbach | 53/389 X |
| 3,285,114 | 11/1966 | Johnson | 83/586 |
| 3,326,567 | 6/1967 | Segal | 83/838 X |
| 3,821,917 | 7/1974 | Hatanaka | 83/203 X |
| 4,296,595 | 10/1981 | Meiners | 53/587 |
| 4,407,113 | 10/1983 | Core | 53/211 X |
| 4,409,784 | 10/1983 | Van Ginhoven | 53/211 X |

FOREIGN PATENT DOCUMENTS 583909 5/1932 Fed. Rep. of Germany ........ 83/835
55441 7/1935 Norway ............................. 83/835

Primary Examiner—John Sipos
Attorney, Agent, or Firm—Jordan and Hamburg

[57] ABSTRACT

Wrapping apparatus for use with a baling machine of the type having a forming chamber in which a round bale is formed and into which a wrapping material is fed to wrap the bale, includes a housing, a feeding device mounted on the housing for feeding a wrapping material from a source of wrapping material to the forming chamber, and a drive on the housing having a drive position for driving the feeding device, the drive being biased into a non-drive position so that the drive is disengaged from driving the feeding device. A cutter is provided for cutting the wrapping material after the wrapping material exits the feeding device, the cutter being movable between a first and a second position. A pivotal lever is operable between an initial position and a first operable position, the pivotal lever being movable from the initial position to the first operable position to actuate the drive from its non-drive to its drive position to thereby drive the feeding device to feed the wrapping material. The cutter is movable from the first position to the second position as the pivotal lever is moved from its initial position to the second operable position, and a cutter release is operable to release the cutter from the second position so that the cutter moves to the first position and in so moving cuts the wrapping material, the cutter release being adjustable to release the cutter after a pre-set number of revolutions of the round bale.

21 Claims, 6 Drawing Figures

WRAPPING APPARATUS FOR ROUND BALES IN BALING PRESSES

BACKGROUND OF THE INVENTION

The invention relates to an apparatus which can be attached to a baling press for the wrapping of a round bale of an agricultural crop located in the forming chamber of the baling press with a section of a wrapping material.

In a known apparatus of this type (DE-PS No. 29 30 590) a drive which can be switched on and off is provided for one of two pulling rollers of a pulling mechanism and is activated by a motor, by a pulling mechanism pulling the baling press or by another drive arrangement comprising a chain drive. In the actual wrapping apparatus of this type, a belt drive is provided instead of the chain drive, the driving belts of which are brought into drive transmission action with the belt pulleys by a press wheel carried by a first pivoting control lever and which can be stopped by releasing the pressure action of the press wheel on the cone belts. The cutting device consists of an elongated single knife having an approximately middle point facing the wrapping path mounted on a carrier guided in a displaceable manner. On the carrier, effective pressure springs work against both displacement directions of the carrier providing the carrier and thus the cutting device a resting position in which the cutting device is located at a distance above the plane of the strip of wrapping material occupied by the strip of wrapping material in the cutting area during the wrapping process. By means of a second pivoting control lever, the cutting device can be lowered against the effect of a first group of springs into a cutting position in which the cutting knife penetrates the plane of the wrapping strip.

In order to carry out the wrapping process after having finished the bale forming, the first pivoting control lever is actuated by an operator switching on the drive for the pulling rollers of the pulling mechanism, pulling off a strip of wrapping material from the supply roll and conveying it to the entrance opening of the crop in the forming chamber. As soon as the strip of the wrapping material has been grasped by the bales or the crop and brought along during continued pulling, the drive can be switched off at the pulling cylinders by returning the first pivoting control lever to its initial position. Continuing movement of the strip of wrapping material by the round bale, which generally performs a rotary movement around its longitudinal axis during the wrapping process by means of conveyor means active in the forming chamber, results in the round bales being increasingly wrapped by the strip of wrapping material until a desired degree of wrapping has been reached. This, generally, is at least an approximately 390° wrapping angle, however, the wrapping angle can be, for example, 720° or 900° as well. In the latter cases, the degree of wrapping assures the secure retention of the wrapping on the outer circumference of the round bale without gluing the overlapping areas of the strip of wrapping material even in those instances when the wrapped bale is ejected out of the forming chamber onto a field.

If the operator notices that a desired degree of wrapping has been reached, the wrapping process can be concluded by activating the second pivoting control lever, thus cutting off the wrapping strip.

It is the object of the invention to provide an apparatus which can be brought into action by activating a single pivoting control lever and which, when having reached a specified degree of wrapping, is automatically turned off.

The apparatus in the invention enables a simple one-lever operation with only the wrapping process having to be initiated when operating the pivoting control lever. During the wrapping process there is a measuring process by which the reaching of a specified degree of wrapping of the round bales can be determined and at the end of which there is an automatic cutting of the strip of wrapping material enveloping the round bale from the elongated length of wrapping material on the supply roll. With the automatic termination of the wrapping process, the apparatus returns to the initial position for the wrapping of a subsequent round bale by repeated operation of the single pivoting control lever. Hand in hand with the simplified operation, there is an increased accuracy of the wrapping since all of the bales are wrapped with the same degree of wrapping by the strips of wrapping material independently of the observations of an operator. The design of the apparatus in the invention enables an especially simple supplementing of baling presses with such an apparatus without significant changes to the baling press and with the lowest possible mounting expenditures. Baling presses can be made by the manufacturer without additional significant expenditures for such subsequent supplementation. The special design of the cutting device assures a rapid and particularly clean cutting of wrapping materials of all types, even of net or lattice-designed wrapping materials, since the separation of the wrapping strip is accomplished by a true cutting process in the entire area of the cutting line, the process being additionally so short that fraying due to breakage because of uneven simultaneous overall cutting can be avoided.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivilents of the claims.

The construction and operation of the invention, however, together with additional objects and advantages thereof will be best understood from the following description of specific embodiments when read in connection with the accompanying drawings.

DESCRIPTION OF THE PREFERRED EMBODIMENTS

Figure 1:
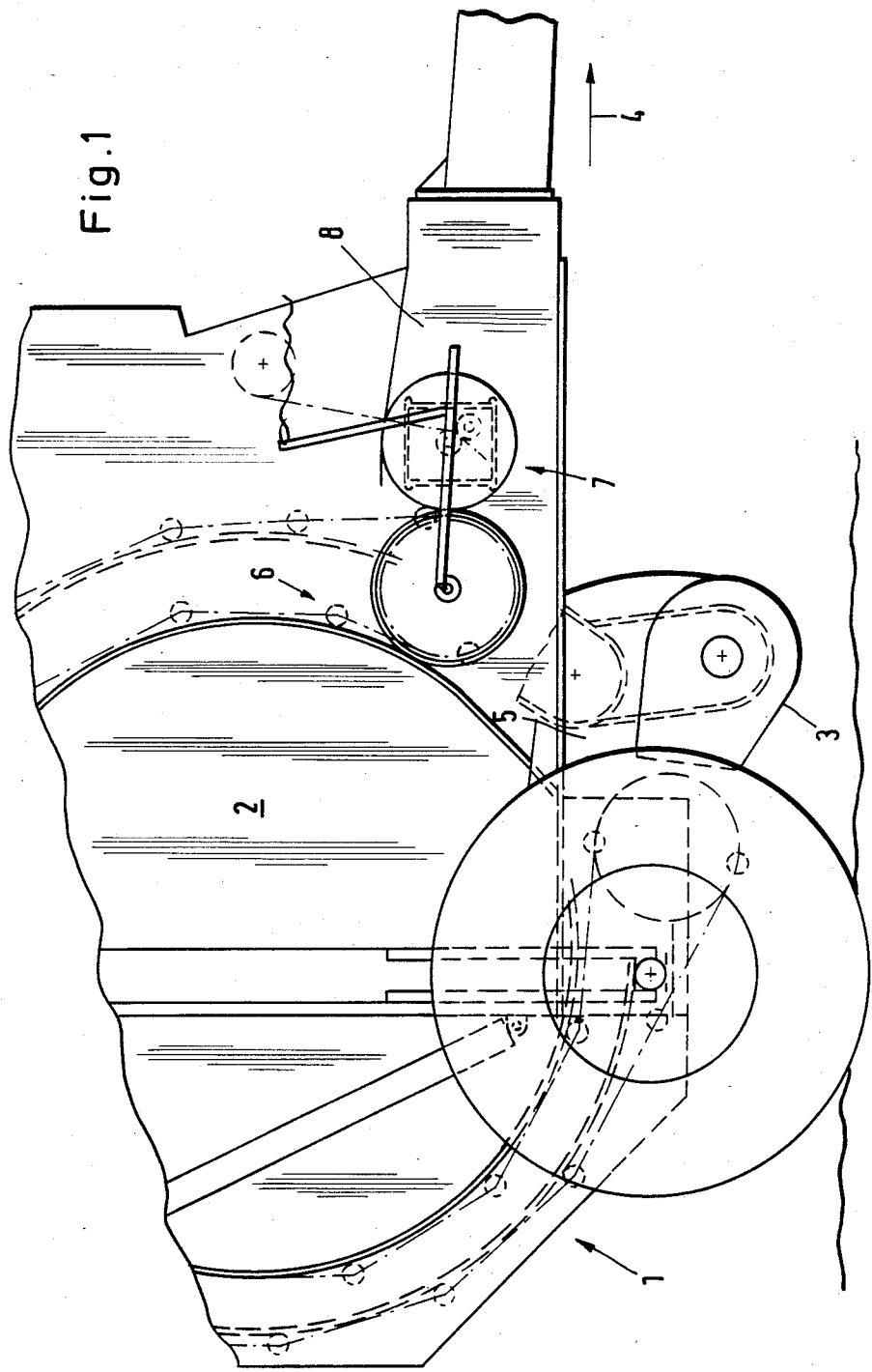
FIG. 1 is a partial schematic elevational view of a baling press with a wrapping apparatus according to the invention.

FIG. 1 illustrates a baling machine 1 with a forming chamber 2, a crop receiving device 3 in front of and below a crop inlet opening 5 leading to the forming chamber 2, and a conveyor means 6 which carries or transports the crop into the forming chamber 2 up to the completion of the forming process for the round bales to be formed. The baling machine is movable in the direction indicated by the arrow 4 in FIG. 1.

Baling presses of this type are already known. Their special design is of no particular importance for the wrapping apparatus in the invention inasmuch as the wrapping apparatus of this invention can be connected to baling presses with a different construction than the one shown in the drawings.

The overall wrapping apparatus has been designated by the numeral 7 and, in the attachement position to the baling press 1, has a position in front of and comparatively closely above the crop inlet opening 5. The wrapping apparatus is constructed as a unit which can be subsequently attached to the front area of the press housing 8.

Figure 2:
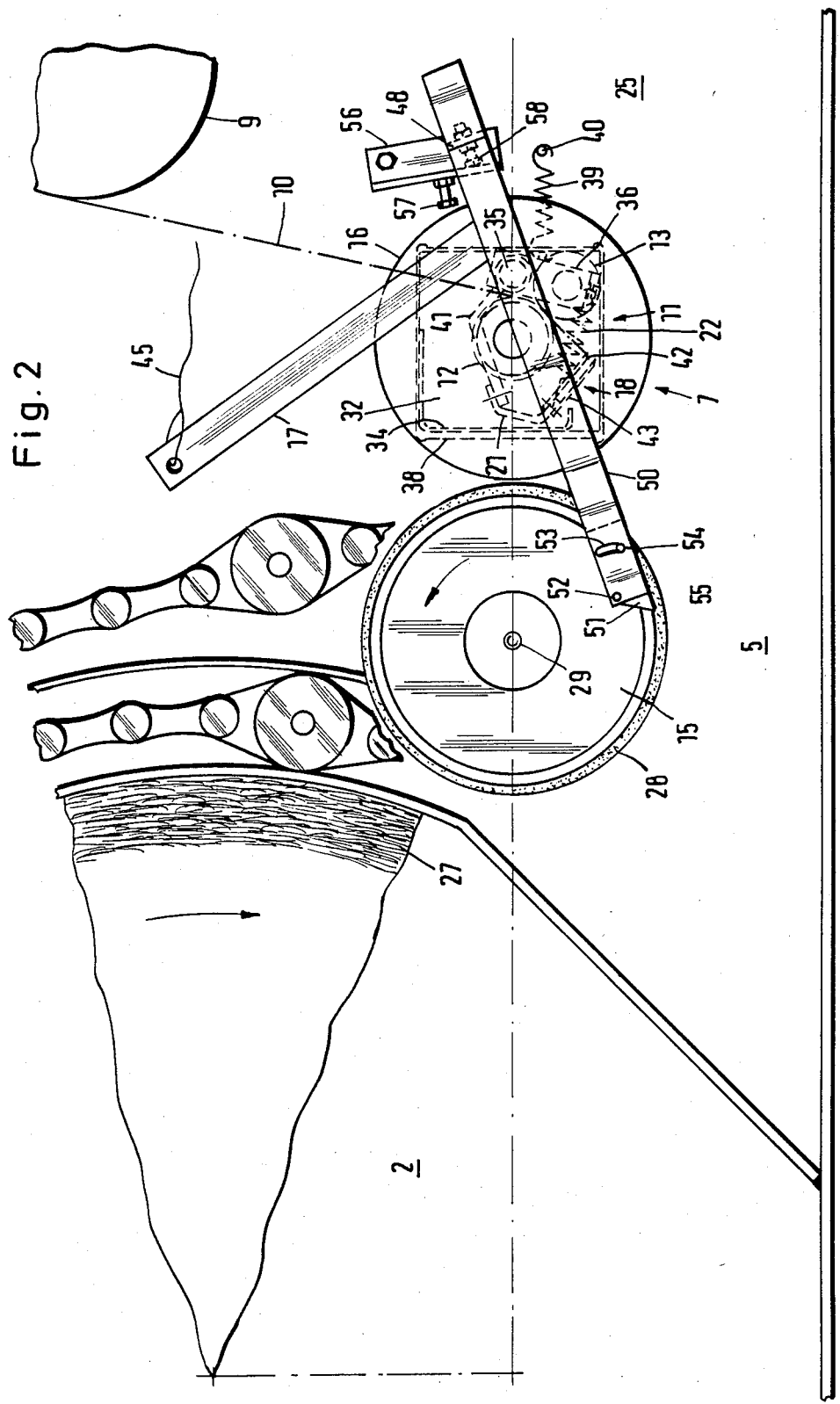
FIG. 2 is an elevational view, similar to FIG. 1 but on a larger scale, showing the wrapping apparatus in the initial position prior to the wrapping process.
Figure 4:
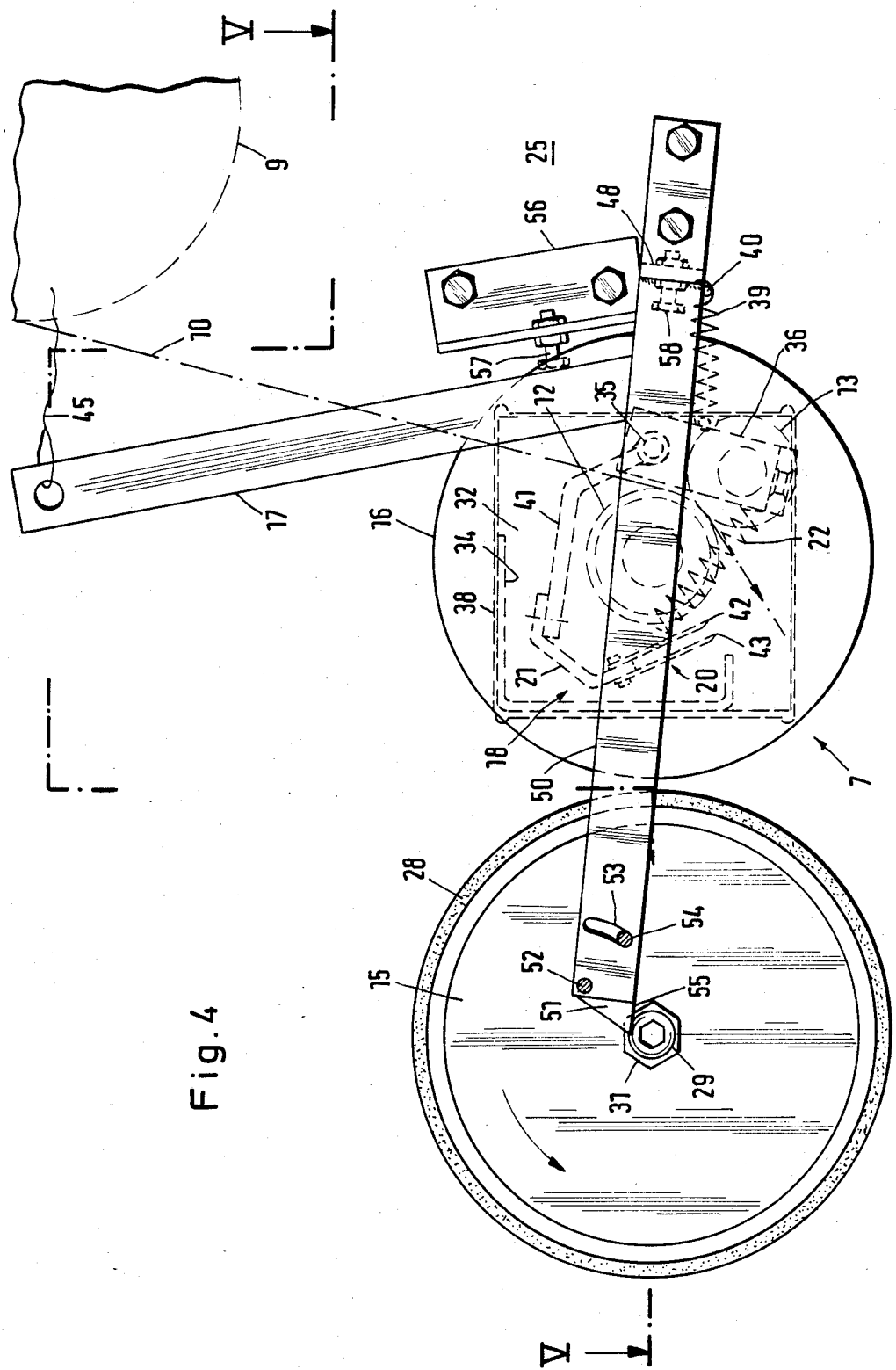
FIG. 4 is a side view, similar to FIG. 3, showing the components of the wrapping apparatus during the wrapping process subsequent to switching off of the drive for the drive mechanism.

As can be seen from the enlarged detailed drawings according to FIGS. 2 and 4, the wrapping apparatus 7 comprises a supply roll 9 of wrapping material which supplies wrapping material 10 along the path shown to a delivery device 11 in the form of two delivery rollers 12, 13 which are in reciprocal mounted pressure engagement and which deliver the wrapping material towards the crop inlet opening.

The wrapping apparatus further comprises a drive device 14 for the delivery device 11 in the form of a friction wheel drive with two friction wheels 15, 16 which are movable by means of a pivoting lever 17 into and out of frictional contact. Finally, the wrapping appartus further comprises a cutting device 18 which can be operated near the end of the wrapping process, and which has a cutting means 20 movable transversely to the flow direction of the path of the wrapping material 10 from the position in FIG. 2 within the path of wrapping material 10 to a position above the wrapping material path. The cutting device is arranged in the area between the crop inlet opening 5 and the delivery device 11 and mounted on a carrier 21 biased by the springs 22 as will be described in greater detail.

Figure 3:
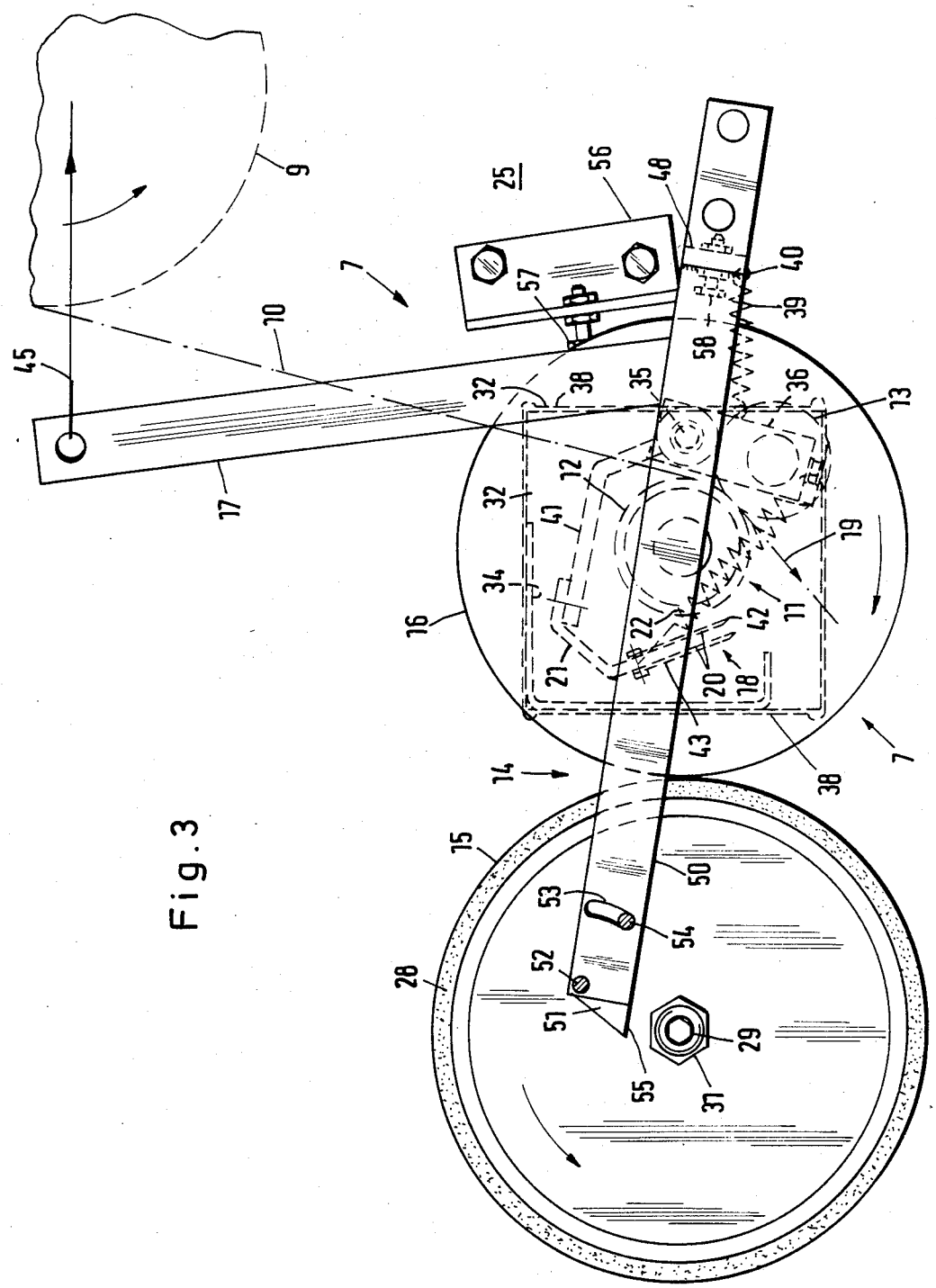
FIG. 3 is a side view, similar to FIG. 2 but on a larger scale, showing the components of the wrapping apparatus during the drive of the drive mechanism in the initial phase of the wrapping process with some of the constructional details being omitted for the sake of clarity of illustration.
Figure 5:
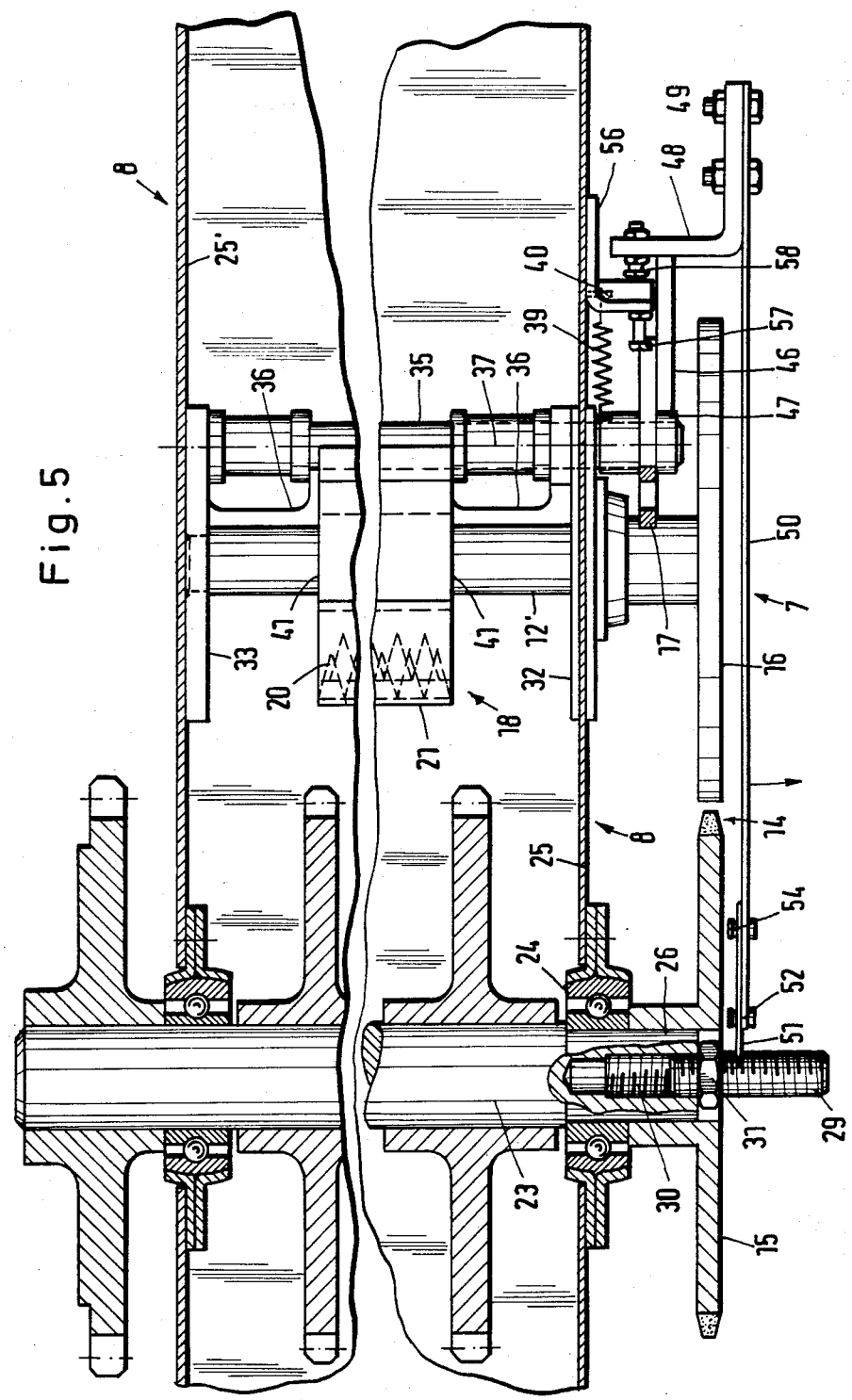
FIG. 5 is a partial schematic cross-sectional view taken along line V—V in FIG. 4

As can be seen especially from FIGS. 3 and 4, which are shown on a larger scale, as well as from FIG. 5, the first friction wheel 15 of the friction wheel drive 14 is fastened to the end of a drive shaft 23 of the conveyor device 6 of the forming chamber 2 of the baling press 1. The corresponding end of the drive shaft 23 is mounted in a bearing 24 in a first wall 25 of the press housing 8 carrying the friction wheel 15 on a component 26 extending beyond the bearing 24 outwardly.

The friction wheel 15 rotates continuously with the drive shaft 23 when the drive shaft 23 is driven during the bale forming operation and during the wrapping operation. The drive shaft 23 is driven, for example, by the pulley for the baling press 1. In the case of forming round bales 27, as schematically shown in FIG. 2, a full rotation of the drive shaft 23 and thus the friction wheel 15 corresponds to an angle of rotation of the round bales 27 and an angle of a segment which is, according to the constructive design of the baling press for example, an eighth of the overall peripheral angle of 360°. This means that in the illustrated embodiment, when the friction wheel 15 makes eight complete revolutions, the round bales have performed a full revolution in the forming chamber 2.

The second friction wheel 16 of the friction wheel drive 14 is rigidly attached to the corresponding end of the shaft 12' carrying the delivery roller 12 of the delivery device 11 and can be moved or shifted from its initial position shown in FIG. 2 where the wheel 16 is without frictional contact with the friction wheel 15. The first friction wheel 15 has a coating 28 at its periphery which increases the coefficient of friction. For example, the coating 28 may be rubber, synthetics or the like and the friction wheel 16 has on its periphery, for example, a not illustrated roughened or corrugated surface.

The first friction wheel has a one-sided protruding scannable measuring means 29 arranged coaxially and which, in a particularly simple embodiment, is formed as a threaded element, the courses of the thread forming a measuring device. The threaded element 29 can be screwed into a blind bore 30 arranged coaxially in the end 26 of the drive shaft 23 and can be fixed by means of a threaded counter nut element 31 in its respective screwed-in position. The screwed-in position is determined with a view towards a desired degree of wrapping of the round bail 27 with the wrapping material in such a way that, for example, for a wrapping of 720° total angle, the protruding end of the threaded element 29 rotates 16 full, freely scannable courses of thread in the area between the threaded nut element 31 and the exterior end of the thread bolt 29. In accordance with the above example, 16 full revolutions of the drive shaft 23 and thus the threaded element 29 correspond to two full revolutions of the round bale 27. By screwing in the threaded element 29 more or less into the blind bore, the measuring section determined by the number of the free, scannable courses of thread can be enlarged or reduced.

The shaft ends of the shaft 12' carrying the delivery roller 12 is mounted in bearings of end-sided base plates 32, 33, and the base plates 32, 33 are connected by concentric connection means into a construction unit. A steel angle profile member 34 can be used as connection means, and such member may, for example, be welded together with the inner sides of the base plates 32, 33, facing one another (not illustrated in FIG. 5 for reasons of clarity).

The pivoting lever 17 is connected to a rocking shaft 35 via a lever arm 46 and a connecting sleeve 47, as will be described in greater detail hereinafter. The rocking shaft 35 is mounted on the two base plates 32, 33 parallel to the delivery rollers 12, 13. The shaft 35 simultaneously serves as a bearing axis for pivotal clamps 36 mounted on shaft 35 in a freely rotatable fashion. These rotating clamps 36 support the second delivery roller 13 via a main bearing which correspondingly can be pivoted in a rotatory movement around the middle axis 37 of the rocking shaft 35 into pressure engagement with the delivery roller 12. A continuous pressure engagement is provided by springs 22 which are connected to carrier 21 for the cutting device 20 and to the pivotal clamps 36. The delivery roll 13 is mounted freely rotatably in its main bearings on the rotating clamp 36 and receives its rotary movement from the delivery roller 12 as a result of the pressure engagement over the wrapping material 10 disposed between the two delivery rollers 12, 13.

The construction unit consisting of the base plates 32, 33, the connection means 34, and the parts carried by the base plate 32, 33 can be inserted through an insertion opening 38 in the wall 25 of the press housing 8 in the form of a slide-in unit. The base plate 33 of the inserted construction unit turned away from the friction wheel drive 14 is rigidly connected to an associated slightly flexible second wall 25' of the press housing 8 of the baling press 1, while the base plate 32 facing the friction wheel drive 14, can be displaced horizontally within limits in the insertion opening 38. For this, the insertion opening 38 is somewhat wider at least in the horizontal direction than the base plate 32 in this direction, in order to enable that the base plate 32 can be displaced from the initial position according to FIG. 2 into the position according to FIG. 3, in which the two friction wheels 15, 16 are pressed in frictional contact. A spring 39 is connected to the base plate 32 at the side turned away from the friction wheel 15 and serves to maintain the base plate 32 in its initial position according to FIG. 2 and following displacement movement in the direction towards the friction wheel, moves the base plate 32 back into the initial position according to FIG. 2. The spring 39 has its other end connected to a pin 40 on the wall 25 of the press housing.

Figure 6:
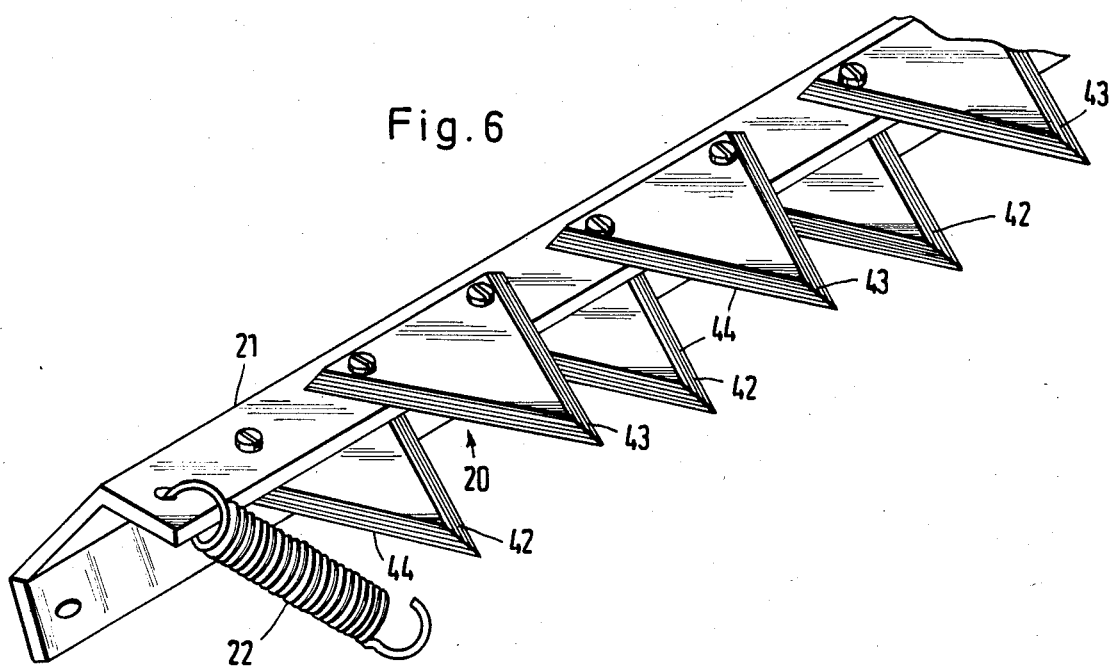
FIG. 6 is a perspective view showing a front elevation of the cutting device and its carrier.

The cutting device 20 includes a holder 21 extending approximately across the width of the wrapping material 10 and parallel to the axis of the delivery rollers. The holder 21 is mounted on bent lever arms 41 secured to the rocking shaft 35, with which the lever 17 pivots. The lever arms extend over the drive shafts of the delivery rollers 12, 13. Together with the bent shape of the holder 21 the cutting device 20 has a configuration as can be seen in the FIGS. 2 to 4. As best can be seen in FIG. 6 the cutting device consists of a plurality of knife elements 42, 43 arranged in two rows and fastened next to one another on the holder 21. The knife elements are approximately triangular. The knife elements arranged in the first row have been designated as 42 and in the second row as 43. The knife elements 42 of the first row are arranged at a distance from one another and parallel to one another. The knife elements 42 are staggered relative to the knife elements 43 of the second row so that the knife elements 42, 43 point towards the wrapping material 10 with a triangular point and, as seen from the front, the sharpened cutting edges 44 of the knife elements 43 of the second row cut the material along with the cutting edges 44 of the knife elements 42 of the first row at points, which form approximately cutting edge bisecting points.

The distance between the knife element 42 of the first row and the knife element 43 of the second row is determined in the illustrated embodiment by the thickness of the carrier holder 21, on the back and the front side of which the first and the second row of knife elements 43, 43 are secured. This particular embodiment of the cutting device enables a clean separating cut, covering the entire width of the wrapping material 10 even when the wrapping material has, for example, a net or lattice structure.

The pivoting lever 17, at the upper end of which a towline 45 can engage, is firmly connected to a lever arm 46 at its lower end which is in turn connected to the end of the rocking shaft 35 by means of a connecting sleeve 47. At the end facing away from the sleeve 47, the lever arm 46 is connected to an angle bracket 48 which carries a wiper arm 50 on a bracket 49. The wiper arm 50 extends over the level of the friction wheel drive 14. The wiper arm 50 extends to the middle area of the friction wheel 15 and is formed as a flexible spring lamination in cross-direction. The wiper arm is adapted to flex laterally. At its free end the wiper arm 50 has a swivel safety catch 51 which is pivotally fastened to the wiper arm 50 by means of a joint pin or bolt 52 in a limited pivotal fashion. The wiper arm 50 has an arch-shaped limiting slot 53 which receives a stop pin 54 mounted on the blade 51. The arrangement has been chosen such that upon upward pivotal movement of the wiper arm 50, the swivel safety catch 51 when contacting the measuring means 29 is pivotally moved out of its operable position, which is shown in FIGS. 2, 3 and 4, and swings in a counter-clockwise direction. After having passed the measuring means 29 the catch 51 falls or pivots back into its locking position shown in FIGS. 2-4. When the swivel safety catch in the operational position is disposed to contact the measuring device 29, it engages the measuring device 29 with its lower scanning edge 55 into the thread, i.e., the threaded measuring section of the measuring device 29 while it simultaneously prevents the wiper arm 50 from returning from its position in FIG. 4 to the initial position according to FIG. 2.

Within the pivoting area of the pivoting lever 17, there is an angle plate 56 which is attached to the wall of the press housing 8, the plate 56 having an adjustable stop 57 adapted to be engaged by the pivoting lever 17. This stop 57 is a sliding abutment against which the pivoting lever 17 bears shortly before reaching the operation end position with the consequence that continued pivotal movement of the pivoting lever 17 (for example in a clockwise direction in FIG. 4) results in the entire lever side end of the construction unit and thus the friction wheel 16 being displaced in the direction of the friction wheel 15 such that the two friction wheels 15, 16 contact one another with a drive transmitting friction. On the lever part 48, there is an additional adjustable stop 58 which, when engaged with the angle plate 56, limits or determines the initial position (i.e. the FIG. 2 position) of the pivoting lever 17 and at the same time prevents the construction unit from being displaced in the direction of the friction wheel 15.

The previously described wrapping apparatus operates as follows. When a round bale 27 has been completely formed in the forming chamber 2, the components of the wrapping apparatus 7 are operated by pivoting lever 17 in a clockwise direction. Thus the lever 17 is pivoted from the initial position shown in FIG. 2, for example, by pulling on the towline 45. The apparatus is thereby transferred into the state illustrated in FIG. 3. In the position of the parts according to FIG. 3 the pivoting lever 17 has reached its operating end position which is defined by the engagement of the friction wheel 16 with the friction wheel 15. This engagement is accomplished by a displacement movement of the base plate 32 in a direction toward the friction wheel 15 in the insertion opening 38, caused by the pushing effect of the pivoting lever 17 as the latter abuts against the abutment 57. When transferring the pivoting lever 17 from its initial position in FIG. 2 to its operating end position in FIG. 3, the cutting device 20 of the cutting apparatus 18 undergoes a rotatory displacement from its resting position according to FIG. 2 into a raised position (FIG. 3) because of the rotation of rocking shaft 35 which approximately corresponds to the later cutting starting position. By this displacement of the cutting device 20 and its holder 21 the springs 22, which were already stretched in the resting position of the cutting device 20 according to FIG. 2, stretch additionally with the pressure engagement between the delivery rollers 12, 13 being thereby increased simultaneously. Furthermore, when moving from the position according th FIG. 2 to the position in FIG. 3, the swivel safety catch 51 of the wiper arm 50 passes the threaded element 29 and moves to its operational position.

In the position of the parts according to FIG. 3 the delivery apparatus 11 receives its driving power from the friction wheel drive 14. This driving power is maintained until the wrapping material moves along the wrapping material path 10, conveyed by the delivery rollers 12, 13, arrives at the crop inlet opening 5 and later into the forming chamber and there conveyed by the round bale 27 itself. As soon as this occurs, the operator ends his pulling on the towline 45 whereby the parts take on the position shown in FIG. 4 as a result of the bias or pulling force of spring 39 and the pulling action of the pulling springs 22. In this position of the parts the swivel safety catch 51 has moved to a position contacting the threaded element 29 with its scanning lower edge 55 resulting in the wiper arm 50 along with the pivoting lever 17, the rocking shaft 35, and the cutting device 20 being locked in a position as shown in FIG. 4 which corresponds to the initial cutting position for the cutting device 20. At the same time, the drive engagement between the friction wheels 15, 16 is interrupted, while together with the drive shaft 23 for the conveyor means 6, the friction wheel 15 as well as the the threaded element 29 continue to rotate. During this continued rotation of the threaded element 29 in a given relationship to the rotation of the round bale 27 in its forming chamber 2, the swivel saftey catch 51 scans the courses of threads of the threaded element 29, resulting in the wiper arm 50 (FIG. 5) continuously deflecting laterally until the swivel saftey catch 51 frees itself from the last thread at the end of the threaded element 29 and allows the wiper arm 50 to fall back into the initial position shown in FIG. 2. With this fall or drop the locking of the cutting device 20 is released from its initial cutting position shown in FIG. 4 and the cutting device 20 pivots with the influence or bias of the springs 22 in a prompt cutting movement which is amplified by the weight of the parts, into the cutting end position according to FIG. 2, separating the wrapping material on its way. Thus the wrapping process is completed and the wrapping apparatus is in its initial position according to FIG. 2 where it is ready for the execution of a renewed wrapping operation. After the cut off, subsequently running of the wrapping material continues because of the continued rotatory movement of the round bale 27 and the fact that the wrapping material is already attached to the circumference of the round bale 27 in the forming chamber 2. Subsequently, the conveyor drive for the round bale 27 can be interrupted and by opening the forming chamber 2, the wrapped round bale 27 can be pushed out and distributed on the ground.

The previously described wrapping apparatus is extremely simple from a construction standpoint and especially suited for rough agricultural business. This also applies for parts 29, 51 and so on which form the measuring and release apparatus on the one hand as well as for the locking apparatus for the locking of the cutting device 20 in its cutting initial position.

Basically, it is also possible to use another suitable measuring and release arrangement as well. For example, one which does not register the degree of wrapping depending on the route of the conveyor means 6 but, for example, directly measures the length of a delivered wrapping material and then when having reached a given measured length, releases the locking of the cutting device 20. It is also feasible, instead of using the locking apparatus formed by the parts 50, 51 to provide a different apparatus which, for example, effects the carrier 21 or its pivotal arm 41 and which has a locking member which is then activated by the measuring and release device.

Furthermore, it is also possible to activate the pivoting lever 17, instead of by pulling on its towline 45 for example, by linkage rods or similar drive means which become effective automatically when the round bale 27 has been completed.

What we claim is:

1. Wrapping apparatus for use with a baling machine of the type having a forming chamber in which a round bale is formed and into which a wrapping material is fed to wrap said bale, comprising a housing means, feeding means mounted on said housing means for feeding a wrapping material from a source of wrapping material to said forming chamber, drive means mounted on said housing for movement between a non-drive position and a drive position for driving said feeding means, biasing means between said drive means and said housing means for biasing said drive means into said non-drive position wherein said drive means is disengaged from driving said feeding means, cutter means pivotably mounted on said drive means for cutting said wrapping material after the wrapping material exits said feeding means, said cutter means being pivotable between a cutting position and a non-cutting position in which said cutter means is clear of the wrapping material exiting from said feeding means, a pivotal lever means connected to said drive means and movable between an initial position and at least one operable position, said pivotal lever means being movable from said initial position to said operable position to move said drive means from its non-drive to its drive position to thereby cause said drive means to drive said feeding means to feed said wrapping material, cutter actuating means mounted on said drive means and connected to said pivotal lever means such that said pivotal lever means in moving from said initial position to said at least one operable position pivots said cutter means from said cutting position to the non-cutting position, means for moving said cutting means to said cutting position, meter means operably connected to said cutter actuating means for retaining said cutter means in said non-cutting position while metering an adjustable predetermined amount of wrapping material fed to wrap said bale, said pivotable lever means being movable by an operator from said initial position to said at least one operable position to pivot said cutter means to said non-cutting position and to actuate said meter means to retain said cutter means in the non-cutting position while metering a metered amount of wrapping material fed to wrap said bale, said metering means having means to actuate said means for moving the cutter means to said cutting position after said metered amount has been metered and when said material has been fed into the pressing chamber and into contact with the bale to thereby release said retention of said cutter means so that the cutter means moves to the cutting position and in so doing cuts off said metered amount of wrapping material.

2. Wrapping apparatus for use with a baling machine of the type having a forming chamber in which a round bale is formed and into which a wrapping material is fed to wrap said bale, comprising a housing means, feeding means mounted on said housing means for feeding a wrapping material from a source of wrapping material to said forming chamber, drive means mounted on said housing for movement between a non-drive position and a drive position for driving said feeding means, biasing means between said drive means and said housing means for biasing said drive means into said non-drive position wherein said drive means is disengaged from driving said feeding means, cutter means pivotably mounted on said drive means for cutting said wrapping material after the wrapping material exits said feeding means, said cutter means being pivotable between a cutting position and noncutting positions in which said cutter means is clear of the wrapping material exiting from said feeding means, a pivotal lever means connected to said drive means and movable between an initial position, an operable position, and an intermediate position between said initial position and said operable position, said pivotal lever means being manually movable from said initial position to said operable position to move said drive means from its non-drive to its drive position to thereby cause said drive means to drive said feeding means to feed said wrapping material, cutter actuating means mounted on said drive means and connected to said pivotal lever means such that said pivotal lever means in moving from said initial position to said operable position pivots said cutter means from said cutting position to a non-cutting position, means for moving said cutting means to said cutting positions, meter means operably connected to said cutter actuating means for retaining said cutter means in said non-cutting position while metering the amount of wrapping material fed to wrap said bale, said biasing means moving said pivotable lever means from said operable position to said intermediate position and biasing said drive means to a non-drive position, means connecting said lever means in its intermediate position to said meter means for actuating said metering means so that said metering means retains said cutter means in the non-cutting position while metering a metered amount of wrapping material fed to wrap said bale, said metering means having means to actuate said means for moving the cutter means after said metered amount of wrapping material has been metered to thereby release said retention of said cutter means from said non-cutting position so that the cutter means moves to said cutting position and in so doing cuts off said metered amount of wrapping material.

3. Wrapping apparatus according to claim 2 wherein said source of wrapping material comprises a rotatably mounted roll of wrapping material supplying wrapping material to said feeding means.

4. Wrapping apparatus according to claim 2 wherein said means for moving said cutter means to said cutting position comprises biasing means for biasing said cutter means toward said cutting position.

5. Wrapping apparatus according to claim 2 wherein said cutter actuating means is operated by said pivotal lever means to dispose said metering means in an initiating position to initiate counting of the turns of said round bale.

6. Wrapping apparatus according to claim 2 wherein said drive means comprises a driving wheel and a driven wheel, mounting means movably mounting said driven wheel on said housing means between a drive position and a non-drive position, said driven wheel in said drive position frictionally engaging said driving wheel so that the driving wheel thereby drives said driven wheel, said driven wheel in said non-drive position being disengaged from said driving wheel.

7. Wrapping apparatus according to claim 6 wherein said drive means comprises a rotatable shaft on which said driving wheel is mounted, said shaft being continuously driven during operation of the baling machine.

8. Wrapping apparatus according to claim 2 wherein said drive means comprises a driving wheel and a driven wheel, said metering means comprises an adjustable measuring means operable to release said cutter means after a pre-set number of revolutions of said bale, said measuring means comprising a measuring element carried on said driving wheel, said metering means further comprising a wiper arm engageable with said measuring element, said pivotal lever means being movable to said intermediate position in which said wiper arm is engaged with said measuring element to initiate counting of the number of turns of said bale, said metering means further comprising release means for disengaging said wiper arm from said measuring element after a pre-set number of turns have been counted to thereby release said cutter means to cut said wrapping material.

9. Wrapping apparatus according to claim 8 wherein said wiper arm is made of an elongated flexible material, said wiper arm flexing laterally during said counting of the number of turns of said bale.

10. Wrapping apparatus according to claim 8 wherein said measuring element is a threaded element threaded into said driving wheel, said wiper arm having an end portion engaging said threaded element so that as said threaded element rotates, said end portion is displaced in a direction generally parallel to the axis of said threaded element such that said end portion is displaced to the longitudinal end of said threaded element to disengage from the threaded element and thereby release said cutter means.

11. Wrapping apparatus according to claim 10 wherein said threaded element projects outwardly of said driving wheel with the extent of said projection being adjustable by manually rotating said threaded element to thereby adjust the setting of said pre-set number of turns which are counted.

12. Wrapping apparatus according to claim 10 wherein said wiper arm comprises a main section to which said end portion is pivotally mounted, said end portion being pivoted to a first position which shortens the longitudinal length of said wiper arm means to permit the latter to move past said threaded element, said end portion being pivotal to a second position which lengthens the longitudinal length of said wiper arm so that said end portion engages said threaded element.

13. Wrapping apparatus according to claim 6 wherein said feeding means comprises a pair of feed rollers each mounted on a roller shaft, said driven wheel being mounted on a support shaft, structural unit means rotatably mounting said roller shafts and said support shaft, said structural unit means and said roller shafts and support shaft being movably mounted on said housing means.

14. Wrapping apparatus according to claim 13 wherein said structural unit means comprises a pair of plates mounting the end portions of said roller shafts and said support shaft, a connecting plate connecting said pair of plates, said housing means having a slightly flexible wall, one of said plates being connected to said wall, the other of said plates being movable mounted relative to said housing means.

15. Wrapping apparatus according to claim 13 wherein said structural unit means is movable between a drive position and a non-drive position, said pivotal lever upon being moved from said initial position to said operable position being operable to move said structural unit means from said non-drive position to said drive position so that said driven wheel is engaged by said driving wheel, said biasing means being between said structural unit and said housing means to urge said structural unit means into said non-drive position in which said driven wheel is disengaged from said driving wheel.

16. Wrapping apparatus according to claim 13 wherein said drive means further comprises a rocking shaft rotatably mounted on said structural unit means, said pivotal lever means being secured to said rocking shaft, an adjustable abutment means adjustably mounted on said housing means, said pivotal lever means upon being moved from said initial position and approaching said operable position engaging said abutment means against which the pivotal lever means abuts to move said structural unit means from said non-drive to said drive position.

17. Wrapping apparatus according to claim 16 wherein said cutter means comprises cutter arms fixed to said rocking shaft and a knife means carried by said cutter arms, said pivotal lever means being moved from said initial position to said operable position rotating said rocking shaft and thereby pivoting said cutter arms to move said cutter means from said cutting to said non-cutting position.

18. Wrapping apparatus according to claim 16 wherein said feeding means comprises arm means pivotably mounted on said rocking shaft, said arm means rotatably mounting at least one of said feeding rolls, and operable biasing means extending between said arm means and said cutter means, said operable biasing means biasing said at least one feed roll into engagement with the other of said feed rolls, said operable biasing means also biasing said cutter means toward said cutting position.

19. Wrapping apparatus according to claim 2 wherein said cutter means comprises a carrier strip and two spaced rows of triangular knife blades fixed to said carrier strip, the triangular blades in each row being spaced from one another, the triangular knife blades in one row being non-aligned and offset relative to the triangular knife blades in the other row.

20. Wrapping apparatus according to claim 19 wherein said triangular knife blades are arranged with the forward triangular points facing the wrapping material to be cut.

21. Wrapping apparatus according to claim 19 wherein each of said triangular knife blades has a pair of cutting edges disposed in a generally V-shaped configuration, the cutting edge of one knife blade in one row generally bisecting the cutting edge of another knife blade in the other row.

* * * * *